(12) United States Patent
Takayama et al.

(10) Patent No.: US 9,462,247 B2
(45) Date of Patent: Oct. 4, 2016

(54) IMAGE PROCESSING AND WHITE BALANCE CONTROLLING APPARATUS

(71) Applicant: CANON KABUSHIKI KAISHA, Tokyo (JP)

(72) Inventors: Masahiro Takayama, Tokyo (JP); Kenji Ouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/515,081

(22) Filed: Oct. 15, 2014

(65) Prior Publication Data

US 2015/0036019 A1 Feb. 5, 2015

Related U.S. Application Data

(63) Continuation of application No. 13/011,308, filed on Jan. 21, 2011, now Pat. No. 8,913,154.

(30) Foreign Application Priority Data

Feb. 4, 2010 (JP) ................................. 2010-023549
Nov. 19, 2010 (JP) ................................. 2010-259524

(51) Int. Cl.
| | |
|---|---|
| *H04N 9/73* | (2006.01) |
| *G03B 17/02* | (2006.01) |
| *H04N 1/60* | (2006.01) |
| *G03B 17/08* | (2006.01) |

(52) U.S. Cl.
CPC ............ *H04N 9/735* (2013.01); *G03B 17/08* (2013.01); *H04N 1/6077* (2013.01); *H04N 9/73* (2013.01); *G03B 2215/0542* (2013.01)

(58) Field of Classification Search
CPC ............................................. G03B 2215/0542

USPC ............ 348/223.1, 81; 396/25–29; 382/162, 382/167, 163
See application file for complete search history.

(56) References Cited

U.S. PATENT DOCUMENTS

| | | | | |
|---|---|---|---|---|
| 5,438,363 A | * | 8/1995 | Ejima et al. ................ | 348/223.1 |
| 5,619,347 A | * | 4/1997 | Taniguchi et al. ............. | 358/516 |
| 6,681,042 B1 | * | 1/2004 | Weldy ........................... | 382/167 |
| 2007/0236564 A1 | * | 10/2007 | Takita .............................. | 348/81 |
| 2008/0084496 A1 | * | 4/2008 | Vasilescu et al. ............ | 348/348 |

FOREIGN PATENT DOCUMENTS

| | | |
|---|---|---|
| CN | 1780406 A | 5/2006 |
| CN | 101193317 A | 6/2008 |

OTHER PUBLICATIONS

The above foreign patent documents were cited in a Jan. 12, 2016 Chinese Office Action, which is enclosed with an English Translation, that issued in Chinese Patent Application No. 201410588874.3.

\* cited by examiner

*Primary Examiner* — Mark Monk
(74) *Attorney, Agent, or Firm* — Cowan, Liebowitz & Latman, P.C.

(57) ABSTRACT

An image processing apparatus comprises an estimation unit which estimates, from color distribution information of an image obtained by capturing an object, a depth of water at which the captured object is positioned, and a white balance control unit which performs white balance control along an axis different from a black body radiation axis in accordance with the depth of water estimated by the estimation unit.

16 Claims, 9 Drawing Sheets

F I G. 3A
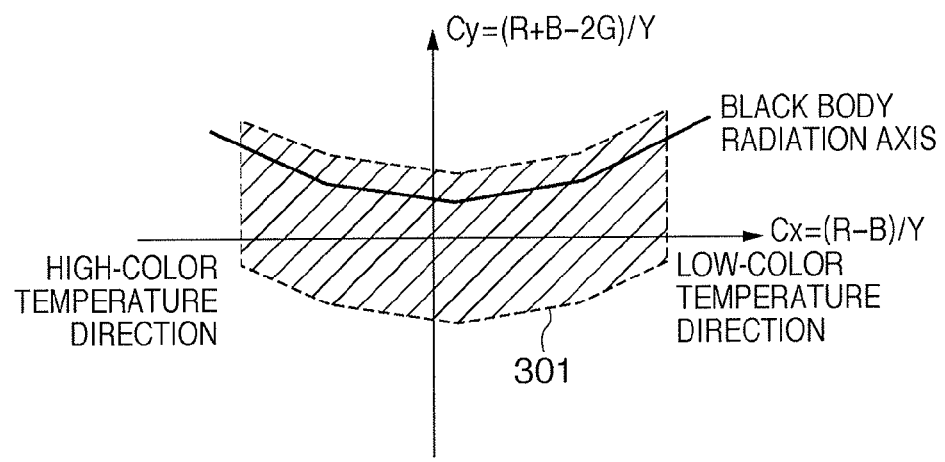
F I G. 3B
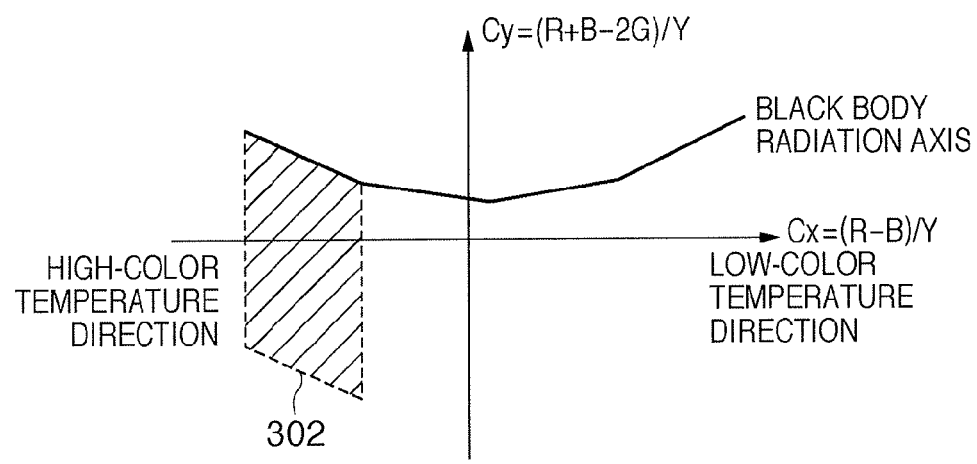

IMAGE PROCESSING AND WHITE BALANCE CONTROLLING APPARATUS

CROSS-REFERENCE TO RELATED APPLICATIONS

This application is a continuation of application Ser. No. 13/011,308, filed Jan. 21, 2011, the entire disclosure of which is hereby incorporated by reference.

BACKGROUND OF THE INVENTION

1. Field of the Invention

The present invention relates to an image processing technique in an image capture apparatus such as a digital camera or digital video camera and, more particularly, to a white balance control technique in water.

2. Description of the Related Art

A signal output from an image sensor is A/D-converted into a digital signal, and the image is divided into a plurality of blocks. The block signal is formed from chrominance signals of R (Red), G (Green), and B (Blue). The color evaluation values of the block are calculated using, for example, equations (1):

$$Cx[i]=(R[i]-B[i])/Y[i]\times 1024$$
$$Cy[i]=(R[i]+B[i]-2G[i])/Y[i]\times 1024 \quad (1)$$

(where $Y[i]=R[i]+2G[i]+B[i]$)

When the color evaluation values $Cx[i]$ and $Cy[i]$ fall within a preset white detection region, it is determined that the block is white. The integral values sumR, sumG, and sumB of color pixels falling within the white detection region are calculated to calculate white balance coefficients in accordance with equations (2):

$$WBCo\_R=sumY\times 1024/sumR$$
$$WBCo\_G=sumY\times 1024/sumG$$
$$WBCo\_B=sumY\times 1024/sumB \quad (2)$$

where $sumY=(sumR+2\times sumG+sumB)/4$

When capturing an image in water, the long-wavelength range of light readily attenuates under the influence of the spectral transmittance of water. The ratio of the R light component to the G and B light components decreases, and the image becomes bluish. In water, as the distance from the water surface (depth from the water surface) to the camera (object) becomes longer, the R color component of natural light entering water from the outside decreases. It therefore becomes difficult to hold the tracking performance of the white balance.

Japanese Patent No. 4144390 discloses a technique of setting an adjustment coefficient used in white balance adjustment before image capturing, and controlling a different white balance adjustment coefficient based on depth information detected by a depth indicator for detecting the depth where the camera is positioned.

However, in the conventional technique disclosed in Japanese Patent No. 4144390, the user needs to capture an object of an achromatic color such as white or gray prepared in advance, which is troublesome and cumbersome. Also, the camera needs to be equipped with, for example, a depth indicator for detecting the depth of water, and the camera cost rises.

SUMMARY OF THE INVENTION

The present invention has been made to solve the above problems, and enables appropriately adjusting white balance in water without attaching any special device to a camera.

According to the first aspect of the present invention, there is provided an image processing apparatus comprising: an estimation unit which estimates, from color distribution information of an image obtained by capturing an object, a depth of water at which the captured object is positioned; and a white balance control unit which performs white balance control along an axis different from a black body radiation axis in accordance with the depth of water estimated by the estimation unit.

According to the second aspect of the present invention, there is provided an image processing apparatus comprising: an estimation unit which estimates, from color distribution information of an image obtained by capturing an object, a depth of water at which the captured object is positioned; and a color gain change unit which changes a color gain matrix in accordance with the depth of water estimated by the estimation unit.

Further features of the present invention will become apparent from the following description of exemplary embodiments with reference to the attached drawings.

BRIEF DESCRIPTION OF THE DRAWINGS

FIGS. 3A and 3B are graphs showing the white detection region;

DESCRIPTION OF THE EMBODIMENTS

Embodiments of the present invention will now be described with reference to the accompanying drawings.

(First Embodiment)

Figure 1:
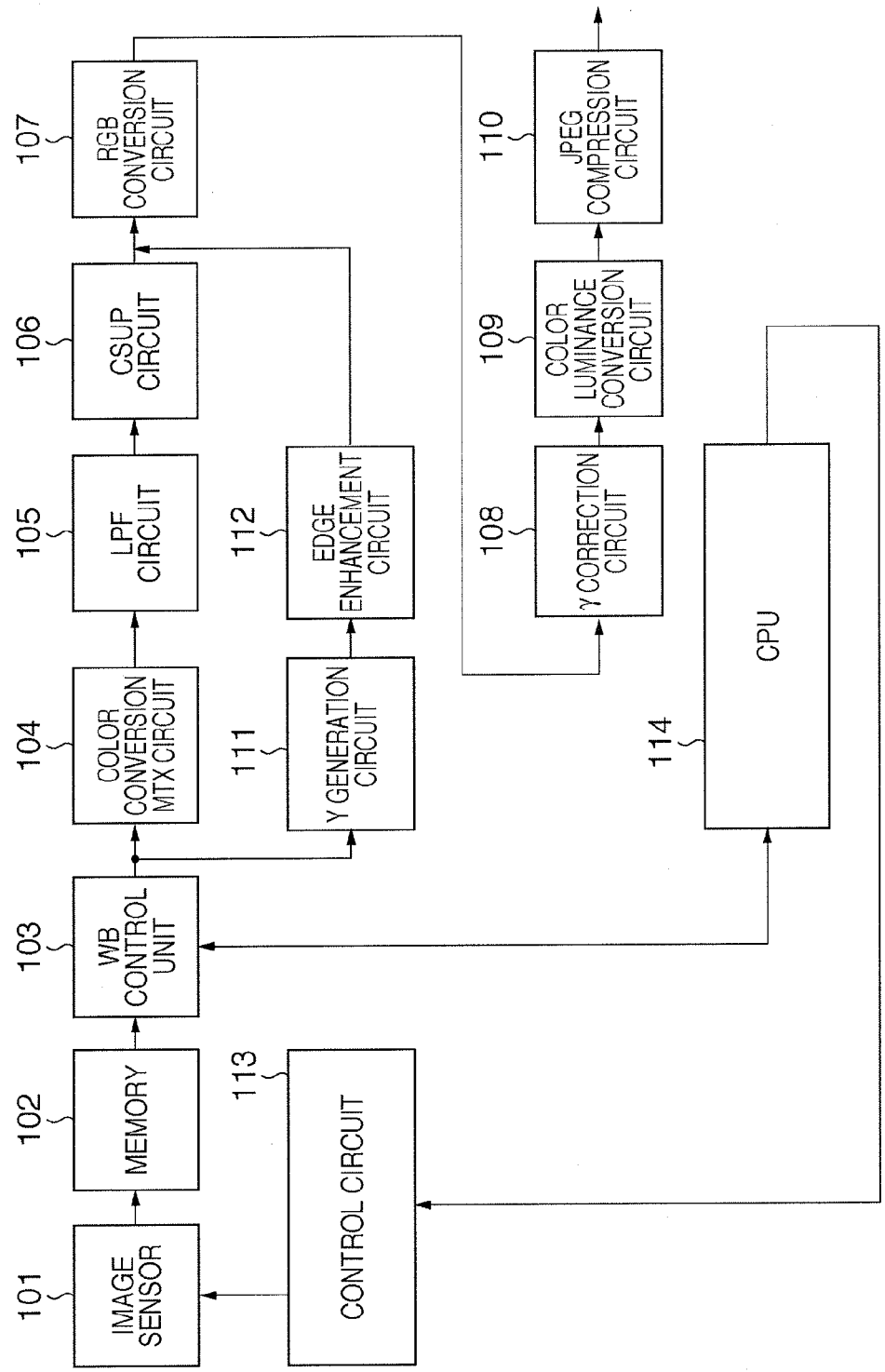
FIG. 1 is a block diagram showing the arrangement of a camera according to the first embodiment of the present invention.

FIG. 1 is a block diagram that shows the arrangement of a camera (image capture apparatus) according to the first embodiment of the present invention. Referring to FIG. 1, a solid-state image sensor 101 is formed from a CCD sensor, CMOS sensor, or the like, and its surface is covered with R (Red), G (Green), and B (Blue) color filters of a Bayer array to enable color image capturing.

A CPU 114 calculates the shutter speed and aperture value to adjust the entire image to appropriate brightness, and also calculates the driving amount of a focus lens in the photographing lens to focus on an object present in the in-focus region. The exposure value (shutter speed and aperture value) and the focus lens-driving amount which have been calculated by the CPU 114 are sent to a control circuit 113.

The control circuit 113 controls the exposure and focus based on the respective values. A WB (White Balance) control unit 103 calculates a WB correction value based on information from an image signal stored in a memory 102, and performs WB correction for the image signal stored in the memory 102 by using the calculated WB correction value. Note that the detailed arrangement and WB correction value calculation method of the WB control unit 103 will be described later.

A color conversion MTX (color conversion matrix) circuit 104 converts an image signal having undergone WB correction by the WB control unit 103 into color different signals R-Y and B-Y by multiplying it by color gains so as to reproduce the image signal in optimum color. An LPF (Low-Pass Filter) circuit 105 restricts the bands of the color different signals R-Y and B-Y. A CSUP (Chroma SUPress) circuit 106 suppresses a false color signal at a saturated portion out of the image signal whose band is restricted by the LPF circuit 105. A Y (luminance signal) generation circuit 111 also receives the image signal having undergone WB correction by the WB control unit 103, and generates a luminance signal Y. An edge enhancement circuit 112 performs edge enhancement processing for the generated luminance signal Y.

An RGB conversion circuit 107 converts the color different signals R-Y and B-Y output from the CSUP circuit 106, and the luminance signal Y output from the edge enhancement circuit 112 into R, G, and B signals. A gamma correction circuit 108 performs tone correction for the R, G, and B signals. A color luminance conversion circuit 109 converts the resultant R, G, and B signals into Y, U, and V signals. A JPEG compression circuit 110 compresses the Y, U, and V signals. The compressed Y, U, and V signals are recorded as an image signal on an external or internal recording medium.

Figure 2:
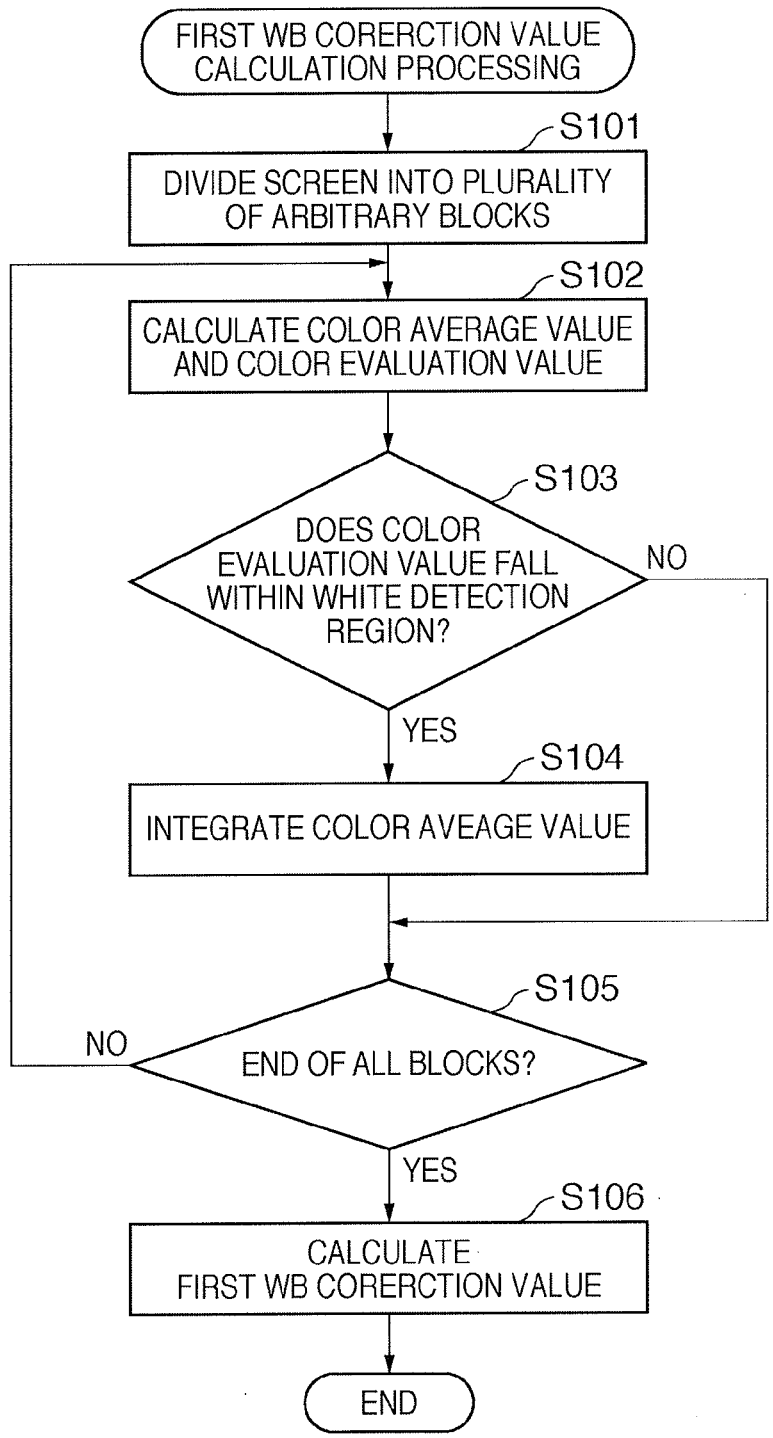
FIG. 2 is a flowchart showing processing of calculating the first WB correction value.

The method of calculating a WB correction value by the WB control unit 103 in FIG. 1 will be explained in detail. First, a method of calculating the first WB correction value will be described with reference to FIG. 2.

The WB control unit 103 reads out an image signal stored in the memory 102, and divides the screen into m arbitrary blocks (step S101). The WB control unit 103 adds and averages pixel values for respective colors in each of blocks 1 to m to calculate color average values R[i], G[i], and B[i]. Then, the WB control unit 103 calculates color evaluation values Cx[i] and Cy[i] using equations (1) (step S102):

$$Cx[i]=(R[i]-B[i])/Y[i]\times 1024$$

$$Cy[i]=(R[i]+B[i]-2G[i])/Y[i]\times 1024$$

where $Y[i]=R[i]+2G[i]+B[i]$

The WB control unit 103 determines whether the color evaluation values Cx[i] and Cy[i] of the ith block calculated in step S102 fall within a preset white detection region 301 shown in FIG. 3A (step S103).

The white detection region 301 is obtained by capturing white under different light sources in advance and plotting calculated color evaluation values. The white detection region can be set separately in the image capturing mode. The negative direction of the x-coordinate Cx in FIG. 3A indicates color evaluation values obtained when whites of high-color temperature objects are captured. The positive direction indicates color evaluation values obtained when whites of low-color temperature objects are captured. The y-coordinate Cy represents the degree of the green component of the light source. The green component increases in the negative direction, and this means that the light source is a fluorescent lamp. The white distribution in water is localized in the blue and green directions. Thus, the white detection region is set to detect the blue and green directions (302 in FIG. 3B). If the calculated color evaluation values Cx[i] and Cy[i] fall within the white detection region 302 (YES in step S103), the WB control unit 103 determines that the block is white, and integrates the color average values R[i], G[i], and B[i] of the block (step S104). If NO in step S103, the WB control unit 103 advances to step S105 without adding the color average values. The processes in steps S103 and S104 can be expressed by equations (3):

$$SumR = \sum_{i=0}^{m} Sw[i] \times R[i]$$

$$SumG = \sum_{i=0}^{m} Sw[i] \times G[i]$$

$$SumB = \sum_{i=0}^{m} Sw[i] \times B[i]$$

(3)

In equations (3), if the color evaluation values Cx[i] and Cy[i] fall within the white detection region (302 in FIG. 3B), Sw[i] is set to 1; otherwise, set to 0. By this setting, processing of adding or not adding the color average values R[i], G[i], and B[i] is substantially performed based on the determination in step S103.

In step S105, the WB control unit 103 determines whether the above processing has been done for all the blocks. If an unprocessed block remains, the WB control unit 103 returns to step S102 to repeat the above processing. If all the blocks have been processed, the WB control unit 103 advances to step S106.

In step S106, the WB control unit 103 calculates the first WB correction values WBCo1 R, WBCo1G, and WBCo1B from the obtained integral values sumR, sumG, and sumB of the color evaluation values using equations (4):

$$WBCo1\_R=sumY\times 1024/sumR$$

$$WBCo1\_G=sumY\times 1024/sumG$$

$$WBCo1\_B=sumY\times 1024/sumB \quad (4)$$

where $sumY=(sumR+2\times sumG+sumB)/4$

Figure 4:
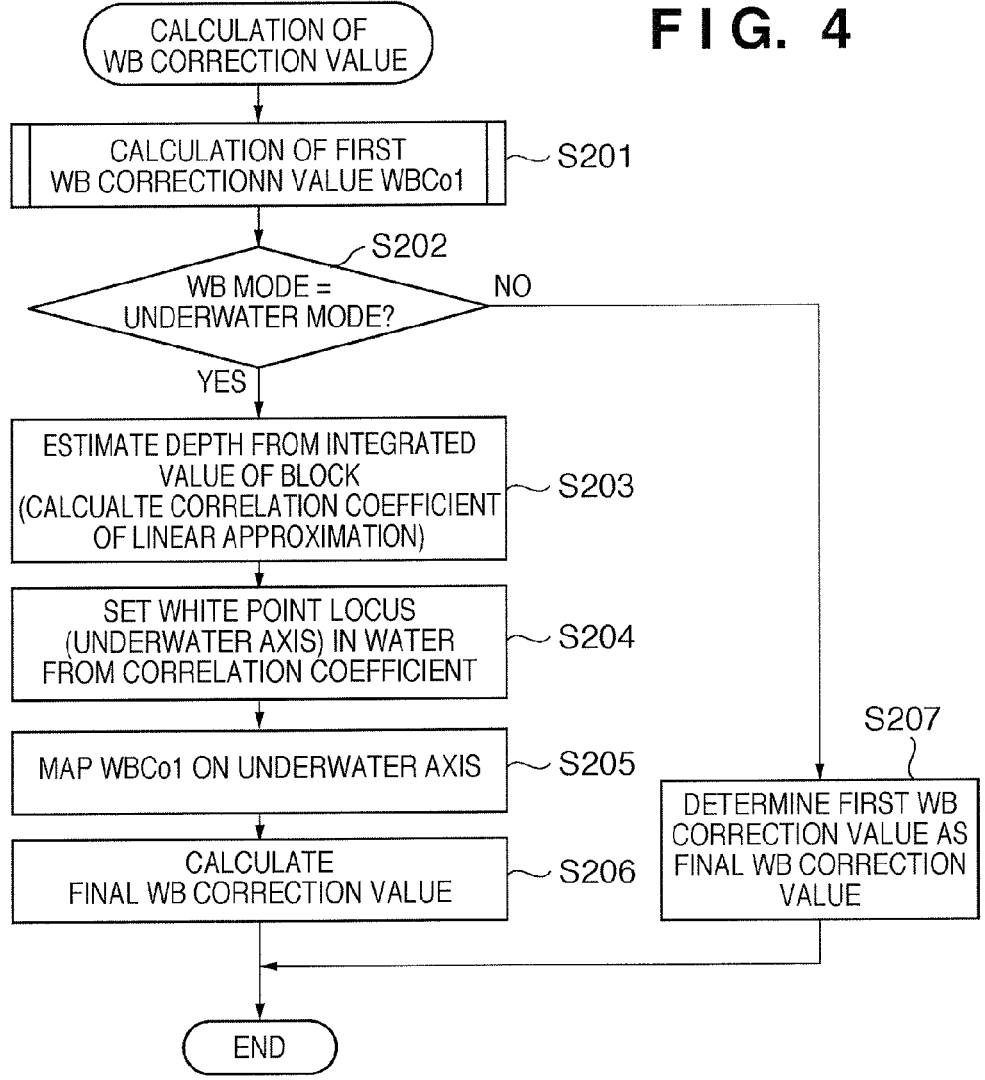
FIG. 4 is a flowchart showing processing of calculating an underwater WB correction value in the first embodiment.
Figure 5:
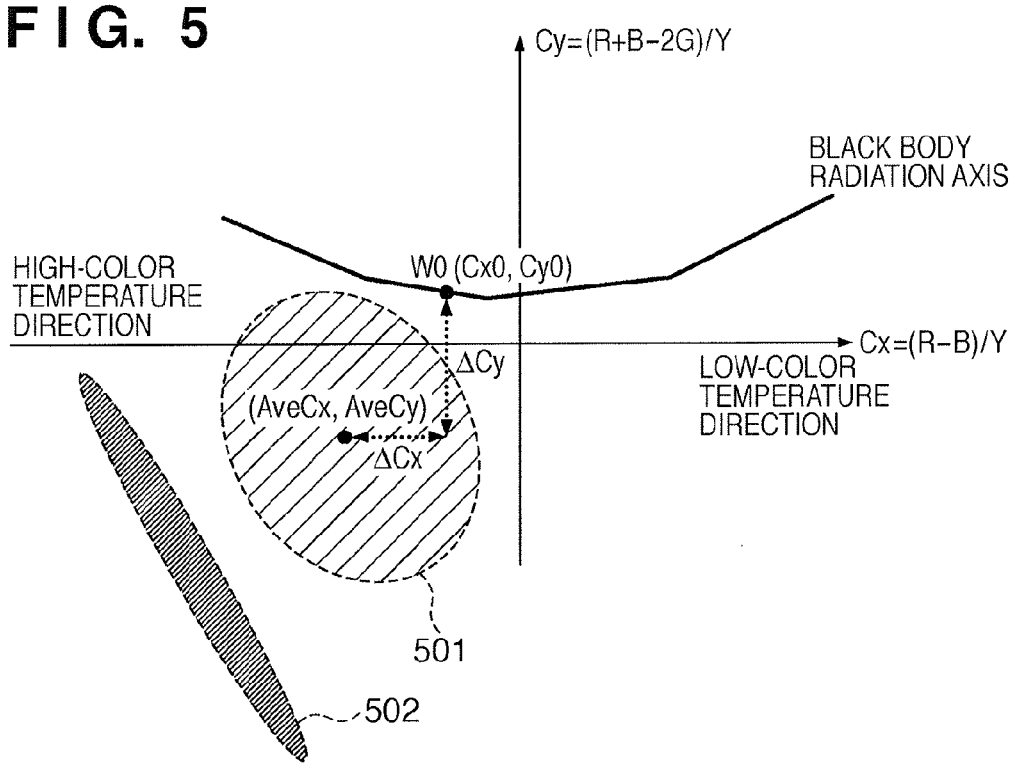
FIG. 5 is a graph showing an underwater color evaluation value distribution.

Next, processing after calculating the first WB correction values will be explained with reference to the flowchart of FIG. 4 and the conceptual view of FIG. 5. In step S202, the WB control unit 103 determines whether the WB mode is the underwater mode. If the WB mode is not the underwater mode, the WB control unit 103 advances to step S207 to set the first WB correction values as the final WB coefficients.

If the WB mode is the underwater mode, the WB control unit 103 divides a captured image into n blocks, and adds and averages pixel values for respective colors in each of blocks 1 to n, calculating color average values R[i], G[i], and B[i] in step S203. Then, the WB control unit 103 calculates the color evaluation values Cx[i] and Cy[i]. As shown in FIG. 5, color evaluation values are distributed like a distribution 501 at a shallow depth (depth of water), and like a distribution 502 at a great depth. In water, as the distance from the water surface (depth from the water surface) to the object position (regarded as the camera position if the camera is close to the object) becomes longer, the R color component of natural light entering water from the outside decreases, so color evaluation values are distributed as shown in FIG. 5. As a means for estimating the depth, the correlation of a linear approximation is calculated from color distribution information of a captured image, and the depth is estimated from the correlation. The correlation expression is $$r^2 = \frac{\left(\sum_{i=1}^{i=n}(Cx[i]-m)(Cy[i]-n)\right)^2}{\sum_{i=1}^{i=n}(Cx[i]-m)^2 \sum_{i=1}^{i=n}(Cy[i]-n)^2}$$

where m is the average value of Cx[i] and n is the average value of Cy[i].

The calculated $r^2$ is defined as a correlation coefficient, and WB control is executed based on the information. This correlation coefficient takes a value of 0 to 1. It is estimated that there is a correlation, that is, the depth is great for a value close to 1, and there is no correlation, that is, the depth is shallow for a value close to 0.

As another means for estimating the depth from color distribution information, the depth is estimated based on the distance between the color distribution of a captured image and the black body radiation axis. This is because, as the depth becomes greater, the color distribution shifts in the blue and green directions, as shown in FIG. 5. In this case, the depth is estimated from the distance between the center of the color distribution of a captured image and the black body radiation axis.

Letting $\Delta Cx$ and $\Delta Cy$ be distances from the black body radiation axis, they are calculated by $$AveCx = \frac{\sum_{i=1}^{n} Cx[i]}{n}$$

$$AveCy = \frac{\sum_{i=1}^{n} Cy[i]}{n}$$

$$\Delta Cx = Cx0 - AveCx$$

$$\Delta Cy = Cy0 - AveCy$$

where W0(Cx0, Cy0) is a point on the black body radiation axis. $\Delta Cx$ and $\Delta Cy$ calculated by the above equations are used as depth estimation determination elements.

Figure 6:
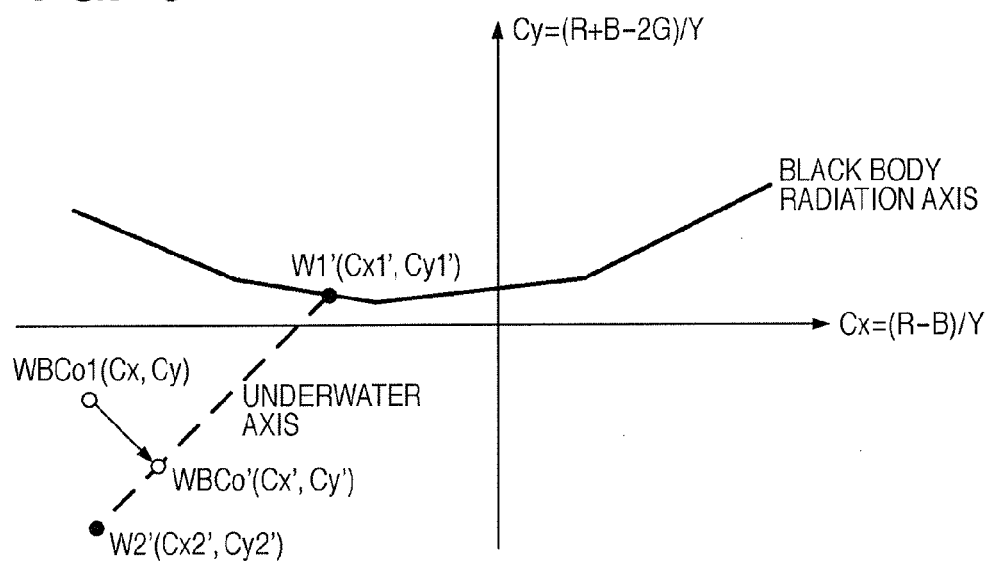
FIG. 6 is a conceptual view showing underwater WB processing.
Figure 7:
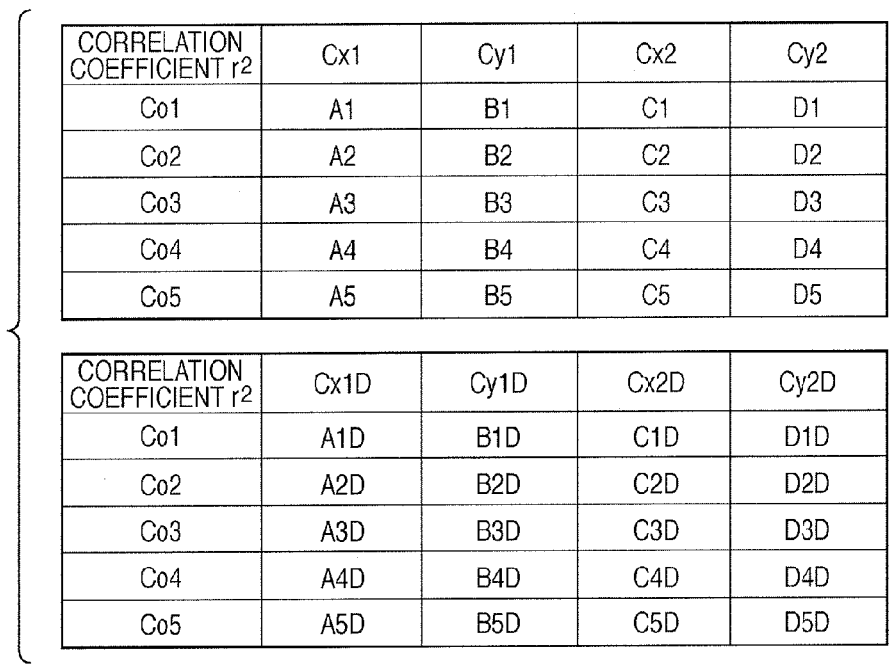
FIG. 7 is a table showing the setting of the underwater axis corresponding to the correlation coefficient.

The locus of white evaluation values in water (which is a white point locus and will be called an underwater axis) exists apart from the black body radiation axis as shown in FIG. 6. Further, the white point in water changes depending on the depth. In step S204, therefore, an underwater axis defined by W1' and W2' is set based on the correlation coefficients (estimated water depth information) obtained by the above calculation, and the calculated distances (estimated water depth information) from the black body radiation axis. As the setting method, W1(Cx1, Cy1), W2(Cx2, Cy2), W1D(Cx1D, Cy1D), and W2D(Cx2D, Cy2D) corresponding to the correlation coefficients are looked up from a table, as shown in FIG. 7. W1D and W2D are underwater axis setting values capable of tracking to a depth greater than by W1 and W2.

Figure 8:
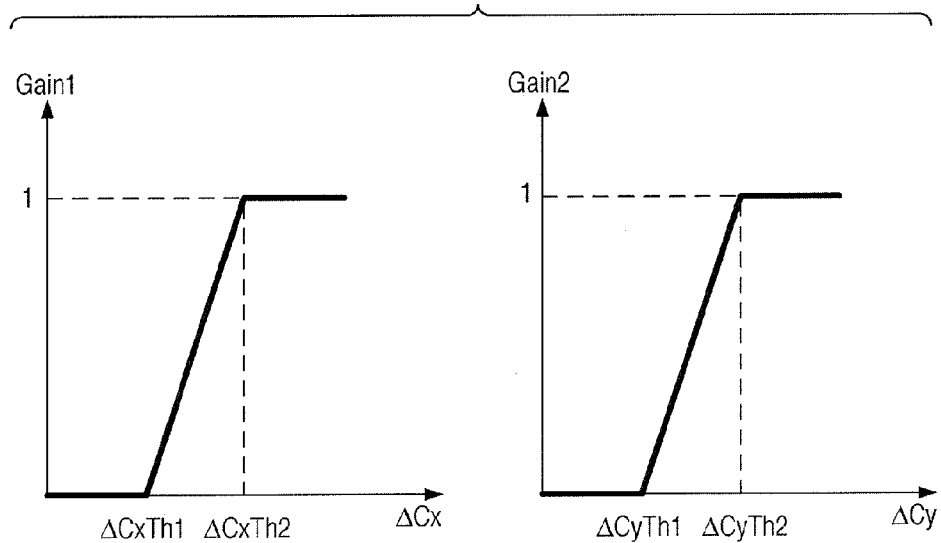
FIG. 8 is a graph showing calculation of a gain value in accordance with the distance between the color distribution and the black body radiation axis.

W1, W2, W1D, and W2D calculated from the table are mixed in accordance with the distances $\Delta Cx$ and $\Delta Cy$ from the black body radiation axis. The mixing ratio β is calculated by obtaining Gain1 and Gain2 from $\Delta Cx$ and $\Delta Cy$, as shown in FIG. 8:

β=Gain1×Gain2

W1'Cx=(1−β)×W1Cx+β×W1DCx

W1'Cy=(1−β)×W1Cy+β×W1DCy

W2'Cx=(1−β)×W2Cx+β×W2DCx

W2'Cy=(1−β)×W2Cy+β×W2DCy

That is, when the correlation coefficient of color distribution information is high and the distance from the black body radiation axis is long, it is determined that the depth is great, and the underwater axis capable of tracking to a greater depth is set.

The relationship between the correlation coefficient and the axis in the table can be obtained experimentally using, for example, images actually captured in water. When the correlation coefficient takes a value between those in the table, it is calculated by linear interpolation.

In step S205, the WB control unit 103 maps the calculated first WB correction value WBCo1 on the underwater axis of W1' and W2', as shown in FIG. 6. In step S206, the WB control unit 103 outputs the mapped point WBCo'(Cx', Cy') as final white balance coefficients WBCo1R, WBCo1G, and WBCo1B.

(Second Embodiment)

The second embodiment will be described. The second embodiment is different from the first embodiment in that WBCo1 calculated in the first embodiment and a WB coefficient calculated by averaging the entire screen are weighted and added depending on the depth, and the resultant WB coefficient is mapped on the underwater axis of W1' and W2'. The remaining processing is the same as that in the first embodiment, and a detailed description thereof will not be repeated.

Figure 9:
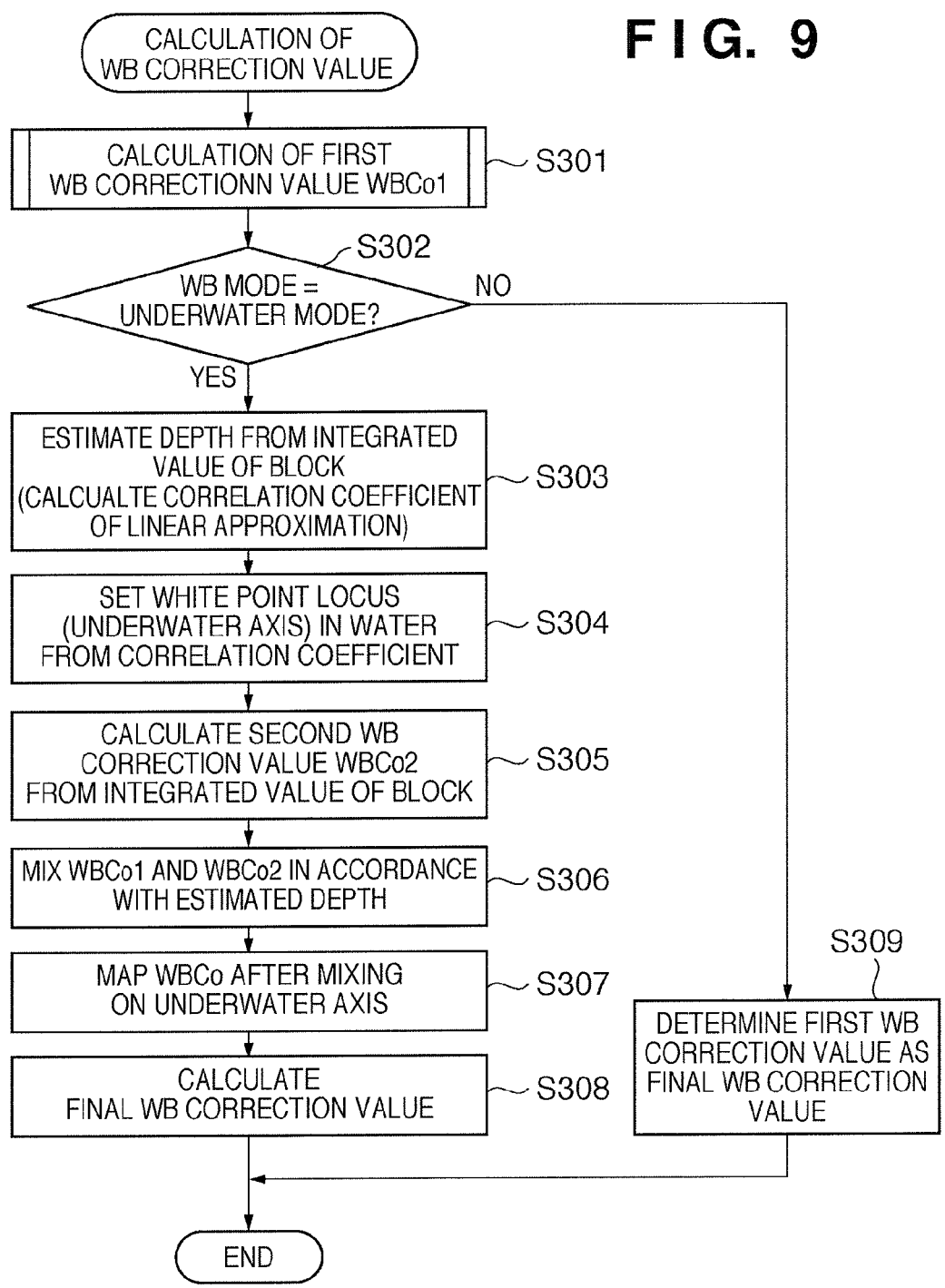
FIG. 9 is a flowchart showing processing of calculating an underwater WB correction value in the second embodiment.

The second embodiment will be explained with reference to the flowchart of FIG. 9. When the depth is great, the color evaluation value may not fall within a detection region 302 in FIG. 3B. To refer to the color distribution of the screen, pixel values are added and averaged for respective colors in each of blocks 1 to n of a captured image, calculating color average values R[i], G[i], and B[i]. Then, color evaluation values Cx[i] and Cy[i] are calculated (step S305). These values are integrated by $$Cx = \sum_{i=1}^{n} Cx[i]$$

$$Cy = \sum_{i=1}^{n} Cy[i]$$

Since the color evaluation value of a color other than white may be added, color evaluation values may be weighted and added not to add an evaluation value apart from the white evaluation value locus. In this case, the color evaluation values are integrated by $$Cx = \frac{\sum_{i=1}^{n}(Cx[i] \times \text{Gain}[i])}{\sum_{i=1}^{n} \text{Gain}[i]}$$

$$Cy = \frac{\sum_{i=1}^{n}(Cy[i] \times \text{Gain}[i])}{\sum_{i=1}^{n}\text{Gain}[i]}$$

The calculated color evaluation values Cx and Cy are set as WBCo2.

Figure 10:
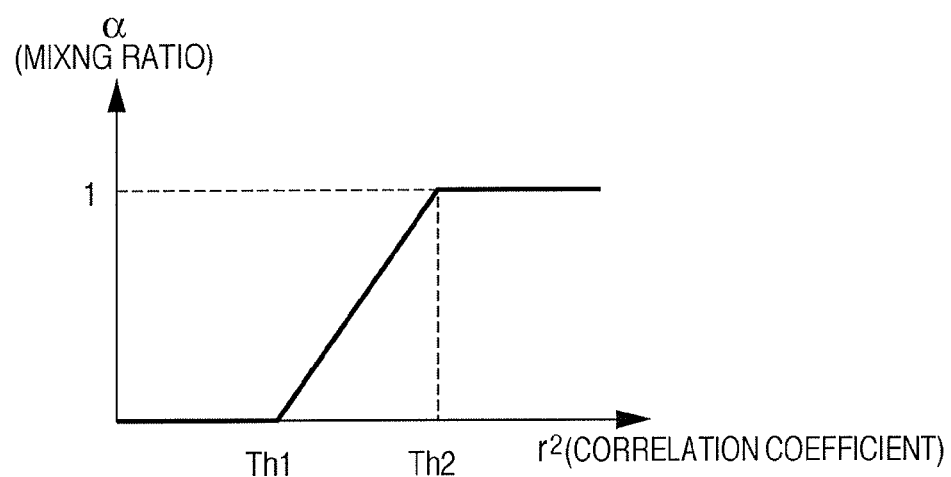
FIG. 10 is a graph showing the ratio used to mix WB coefficients in accordance with the depth.

In step S306, the calculated WB correction values WBCo1 and WBCo2 are mixed in accordance with the estimated depth, that is, correlation coefficient. The mixing ratio α is determined in accordance with the estimated depth (correlation coefficient), as shown in FIG. 10. More specifically, WBCo1 and WBCo2 are mixed at a ratio:

WBCo1:WBCo2=(1−α):α

In step S307, the white balance coefficient obtained by mixing processing is mapped on the underwater axis, as shown in FIG. 6. The mapped point is output as final white balance coefficients WBCo1 R, WBCo1G, and WBCo1B (step S308).

(Third Embodiment)

The third embodiment will be described. The third embodiment is different from the first and second embodiments in a block used in correlation calculation of a linear approximation. The remaining processing is the same as that in the second embodiment (flowchart of FIG. 9), and a detailed description thereof will not be repeated.

Figure 11:
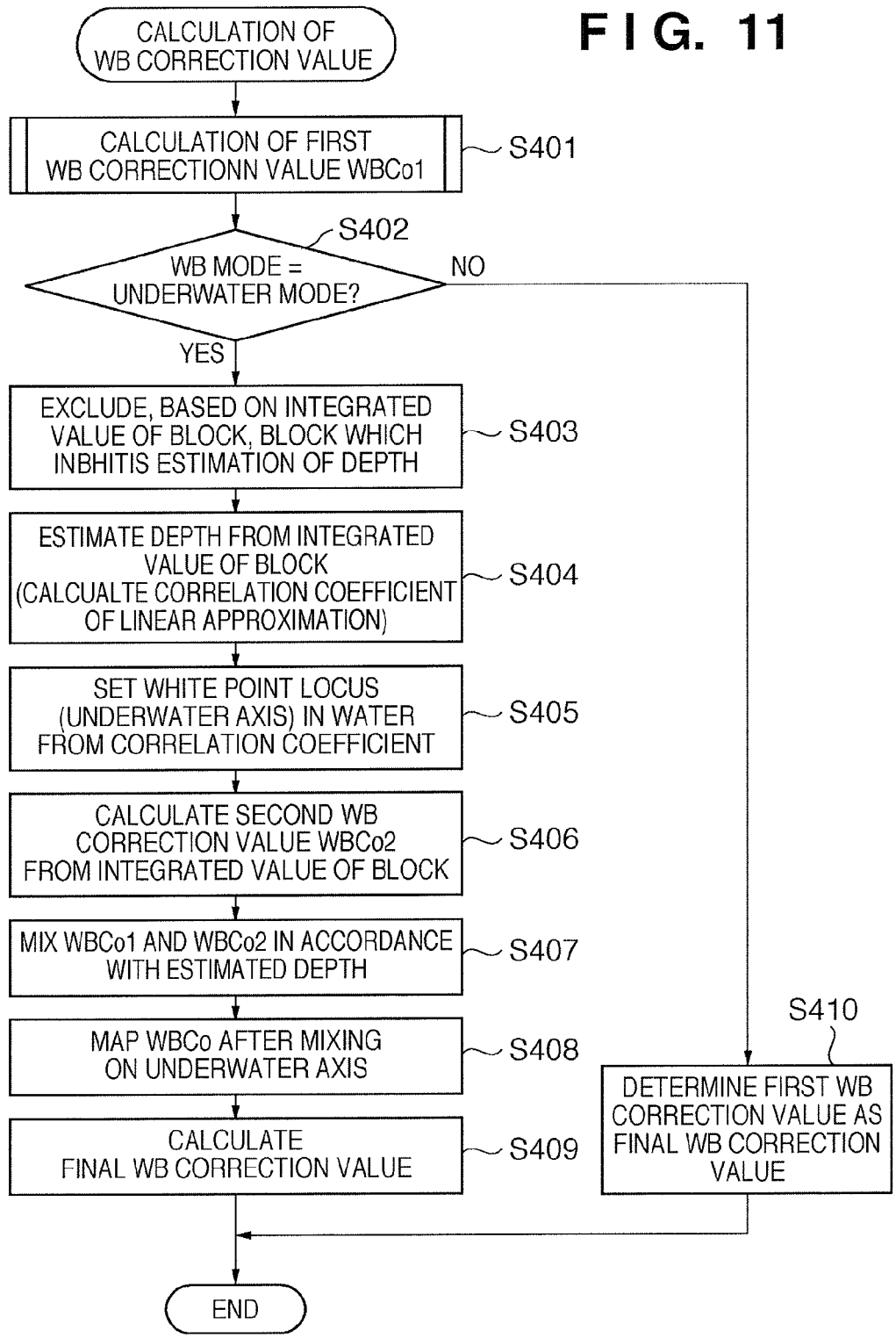
FIG. 11 is a flowchart showing processing of calculating an underwater WB correction value in the third embodiment.

The third embodiment will be explained with reference to the flowchart of FIG. 11. There are several factors which inhibit estimation of the depth of water (decrease the correlation coefficient from an original value). Examples of these factors are a high-luminance portion (for example, underwater light), a low-luminance portion (for example, rock shadow), and a high-saturation portion (for example, fish). As an example of the criterion for determining a high-luminance portion, low-luminance portion, and high-saturation portion, a portion where at least one of the R (Red), G (Green), and B (Blue) values exceeds a threshold is determined as a high-luminance portion, a portion where the luminance is lower than a threshold is determined as a low-luminance portion, and a portion where at least either the R or G value is larger than a threshold with respect to the B value is determined as a high-saturation portion.

A block (corresponding to at least one of high luminance, low luminance, and high saturation) determined, based on the color average value of each block of the captured image, to inhibit estimation of the depth of water is excluded as an exclusive region from calculation targets in calculation of the correlation coefficient (step S403). This can decrease the water depth estimation error.

At this time, if a predetermined number of blocks or more are excluded, a correlation coefficient (depth of water) calculated immediately before the number of excluded blocks exceeds a predetermined value (predetermined area) may be used. Alternatively, a correlation coefficient (depth of water) calculated immediately before the number of excluded blocks exceeds a predetermined value, and a newly calculated correlation coefficient (depth of water) may be weighted and averaged at a ratio calculated in accordance with the situation (for example, the time elapsed after the number of excluded blocks exceeds the predetermined value).

(Fourth Embodiment)

The fourth embodiment will be described. In the first to third embodiments, when estimating the depth, linear approximation is executed based on the color evaluation value distribution of a captured image, and the control can be changed in accordance with the correlation coefficient.

In the fourth embodiment, elliptical approximation is performed based on the color evaluation values of a captured image, and the depth is estimated from the ratio of the lengths of the major and minor axes of the ellipse.

As described above, in water, as the distance from the water surface (depth from the water surface) to the camera (object) becomes longer, the R color component of natural light entering water from the outside decreases. At a great depth, color evaluation values are distributed like a distribution 502 in FIG. 5. The depth is estimated from the ratio of the length a of the major axis and the length b of the minor axis of the ellipse (a>b>0). More specifically, b/a takes a value of 0 to 1. It is estimated that the depth is greater as b/a comes close to 0, and shallower as b/a comes close to 1. The fourth embodiment is the same as the first to third embodiments except for the water depth estimation method, and a detailed description thereof will not be repeated.

(Other Embodiments)

The present invention is not limited to white balance control, and the color gain matrix may be changed in accordance with the estimated depth. For example, the R color component decreases for a greater depth, and the red color is hardly developed. In other words, desired color reproduction can be obtained by switching the R gain (changing the color gain) based on estimated depth information.

Alternatively, control such as AF or AE may be changed in accordance with the estimated depth. If the image capture apparatus has a display device for displaying an image, a UI to be displayed or the quality of an image may be changed in accordance with the estimated depth.

In the above-described embodiments, the present invention is practiced in an image capture apparatus. However, the present invention is not limited to this and is applicable to any image processing apparatus having a function of performing white balance control for an image. For example, application software running on a personal computer executes processing of the present invention for a RAW image file (data file before white balance correction that is output from the image sensor).

The present invention is also implemented by executing the following processing. More specifically, software (program) for implementing the functions of the above-described embodiments is supplied to a system or apparatus via a network or various storage media. The computer (or the CPU or MPU) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-023549, filed Feb. 4, 2010 and 2010-259524, filed Nov. 19, 2010, which are hereby incorporated by reference herein in their entirety.

What is claimed is:

1. An image processing apparatus comprising:
a processor performing the functions of a calculation unit, an estimation unit, and a white balance control unit wherein;

the calculation unit calculates a color evaluation value of each of blocks of an image obtained by capturing an object, the estimation unit estimates, based on a shape of a distribution pattern of the calculated color evaluation values on a color space, a depth of water at which the captured object is positioned; and the white balance control unit performs white balance control using a white balance correction value determined in accordance with the depth of water estimated by said estimation unit.

2. The apparatus according to claim 1, wherein said estimation unit performs linear approximation for the distribution of the color evaluation values of the captured image to obtain a correlation coefficient, and estimates the depth of water from the correlation coefficient.

3. The apparatus according to claim 1, wherein said estimation unit estimates the depth of water in accordance with a distance between the distribution of the color evaluation values of the captured image and the black body radiation axis.

4. The apparatus according to claim 1, wherein said estimation unit performs elliptical approximation for the distribution of the color evaluation values of the captured image, and estimates the depth of water from a ratio of a length of a major axis and a length of a minor axis of an ellipse.

5. The apparatus according to claim 1, wherein said white balance control unit determines the white balance correction value along an axis different from a black body radiation axis in accordance with the depth of water estimated by said estimation unit, and wherein the axis different from the black body radiation axis is an axis indicating a white point locus in water that corresponds to the depth of water.

6. The apparatus according to claim 5, wherein the axis indicating the white point locus in water that corresponds to the depth of water is changeable based on water depth information obtained by said estimation unit.

7. The apparatus according to claim 1, wherein said white balance control unit maps, on an axis indicating a white point locus in water that corresponds to the depth of water, a white balance coefficient with which white has been detected to determine the white balance correction value.

8. The apparatus according to claim 1, wherein said white balance control unit weights and adds a white balance coefficient with which white has been detected, and a white balance coefficient calculated from a color distribution of a captured image, and maps the white balance coefficient on an axis indicating a white point locus in water that corresponds to the depth of water to determine the white balance correction value.

9. The apparatus according to claim 8, wherein said white balance control unit weights and adds, based on water depth information obtained by said estimation unit, the white balance coefficient with which white has been detected, and the white balance coefficient calculated from the color distribution of the captured image to determine the white balance correction value.

10. The apparatus according to claim 1, wherein when a region corresponding to at least one of high luminance, low luminance, and high saturation exists in the image, said estimation unit excludes the region from calculation targets for estimating the depth of water.

11. The apparatus according to claim 10, wherein the high-luminance region includes a region where a value of at least one of R (Red), G (Green), and B (Blue) signals exceeds a threshold.

12. The apparatus according to claim 10, wherein the low-luminance region includes a region where luminance is lower than a threshold.

13. The apparatus according to claim 10, wherein the high-saturation region is a region where a ratio of a value of least one of R and G signals is larger than a threshold with respect to a value of a B signal.

14. The apparatus according to claim 10, wherein when an excluded region serving as a region excluded from the calculation targets for estimating the depth of water exceeds a predetermined area, said estimation unit uses a depth of water estimated immediately before an area of the excluded region exceeds the predetermined area, or weights and averages the depth of water estimated immediately before and a newly estimated depth of water.

15. An image processing apparatus comprising:
a processor performing the functions of a calculation unit, an estimation unit and a color gain change unit wherein;

the calculation unit calculates a color evaluation value of each of blocks of an image obtained by capturing an object, the estimation unit estimates, based on a shape of a distribution pattern of the calculated color evaluation values on a color space, a depth of water at which the captured object is positioned; and the color gain change unit changes a color gain matrix in accordance with the depth of water estimated by said estimation unit.

16. An image capturing apparatus comprising:
a processor performing the functions of a capturing unit, a calculation unit, an estimation unit and a white balance control unit wherein;

the capturing unit captures an object, the calculation unit which calculates a color evaluation value of each of blocks of an image obtained by capturing the object, the estimation unit estimates a depth of water at which the captured object is positioned, based on a shape of a distribution pattern of color evaluation values on a color space obtained by plotting the calculated color evaluation values on a color plane; and the white balance control unit performs white balance control using a white balance correction value determined in accordance with the depth of water estimated by said estimation unit.

* * * * *